Figure 1:
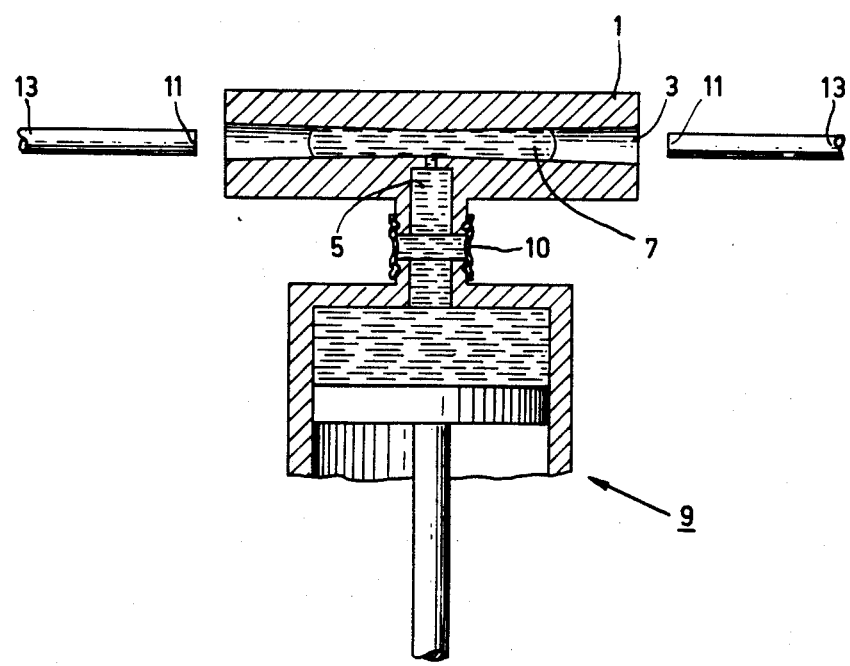

United States Patent
Khoe

[11] 4,030,810
[45] June 21, 1977

[54] METHOD OF COUPLING LIGHT CONDUCTORS

[75] Inventor: Giok Djan Khoe, Eindhoven, Netherlands

[73] Assignee: U.S. Philips Corporation, New York, N.Y.

[22] Filed: May 2, 1975

[21] Appl. No.: 573,969

[30] Foreign Application Priority Data

May 24, 1974 Netherlands .................... 7406963

[52] U.S. Cl. ........................................ 350/96 C
[51] Int. Cl.² ...................................... G02B 5/14
[58] Field of Search ......... 350/96 R, 96 WG, 96 C

[56] References Cited
UNITED STATES PATENTS

| | | | |
|---|---|---|---|
| 3,455,625 | 7/1969 | Brumley et al. | 350/96 C |
| 3,783,065 | 1/1974 | Stone | 350/96 C X |
| 3,870,395 | 3/1975 | Schicketanz | 350/96 C |
| 3,880,452 | 4/1975 | Fields | 350/96 C X |

FOREIGN PATENTS OR APPLICATIONS 2,314,687  9/1973  Germany ...................... 350/96 C

*Primary Examiner*—Edward S. Bauer
*Assistant Examiner*—Rolf Hille
*Attorney, Agent, or Firm*—Frank R. Trifari; David R. Treacy

[57] ABSTRACT

A connecting plug for coupling light conductors using a coupling liquid and a method of coupling light conductors by sucking the conductors into the plug.

A transverse duct opens into a capillary duct in the plug. A coupling liquid is forced into the capillary from the transverse duct. The glass fibres are then inserted as far as into the liquid, and are subsequently sucked further into the capillary by sucking off the liquid through the transverse duct.

2 Claims, 2 Drawing Figures

METHOD OF COUPLING LIGHT CONDUCTORS

The invention relates to a connecting plug for coupling at least two light conductors in the axial direction, the plug being provided with at least one continuous duct for accommodating the light conductors to be coupled, and furthermore relates to a method of coupling light conductors using the connecting plug.

The coupling of light conductors via a liquid-filled duct is known. The liquid to be used for this purpose has a refractive index which is at least substantially equal to the refractive index of the core glass of the light conductor in order to avoid loss of light.

The diameter of the duct in known plugs is substantially larger than the diameter of the light conductors to be coupled, because the liquid present in the space between the ends of the light conductors should have the possibility of flowing off during coupling. If the difference in diameter is too small, the one light conductor, when inserted into the duct, pushes an already inserted light conductor out of the duct again, or such a force must be exerted on the light conductors that a high risk of buckling and hence breaking arises. Light conductors are capable of withstanding only a comparatively small buckling load. Due to the fact that the light conductors are pressed into the duct on both sides, any dirt present in the duct will collect between the light conductors, exactly between the ends to be coupled. The collected dirt thus increases the loss of light in this connecting plug. Due to the necessary difference in the diameters of the light conductor and the duct, the positioning of the light conductor ends to be coupled with respect to each other is comparatively difficult in known plugs, so that loss of light occurs in the coupling.

The invention has for its object to eliminate these drawbacks and to provide a plug whereby a simple, low-loss coupling can be realized. To this end, according to the invention the plug comprises a transverse duct, one end of which opens into a side wall of the continuous duct, it being possible to couple another end of the transverse duct to a suction/pressure device.

According to the method of coupling the light conductors by means of such a connection plug the transverse duct of the plug has connected thereto a suction pressure device whereby a transparent liquid (coupling liquid) having a refractive index which substantially corresponds to that of the central portion of the light conductors to be coupled is brought into the continuous duct via the transverse duct, the ends of the light conductors to be coupled being inserted into the continuous duct as far as into the coupling liquid, the ends being subsequently sucked towards each other by the partial sucking out of the coupling liquid by means of the said suction/pressure device, after which the suction/pressure device is removed and the transverse duct is closed. Because the air present in the plug or the liquid to be used in the plug is sucked off or pushed away through the transverse duct, the diameter of the duct can be more accurately adapted to the diameter of the light conductor, so that a more exact positioning of the light conductors is achieved. It is an additional advantage that the risk of breaking is substantially reduced when the light conductors are sucked into the duct in a connecting plug according to the invention, because light conductors can withstand a tensile load which is much larger than a buckling load. One preferred embodiment according to the invention will be described in detail hereinafter.

Figure 2:
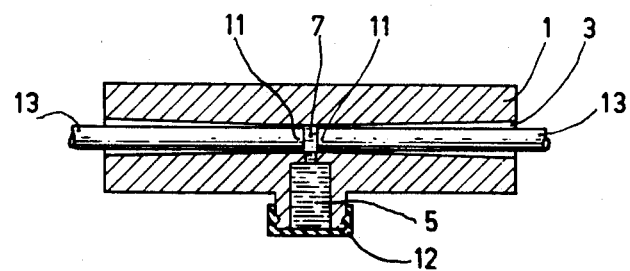

FIG. 1 is a diagrammatic sectional view through a preferred embodiment of a connecting plug according to the invention for coupling light conductors, and FIG. 2 is a diagrammatic sectional view through the connecting plug shown in FIG. 1 with coupled light conductors.

A connecting plug as shown in the FIGS. 1 and 2 comprises a body 1 wherethrough a longitudinal capillary duct 3 extends. A transverse duct 5 opens into the duct 3, preferably approximately halfway between the ends of the duct 3. The portions of the longitudinal duct 3 to each side of the transverse duct 5 each taper from maximum cross-sections at the respective ends of the longitudinal ducts to minimum cross-sections adjacent the transverse duct, the minimum cross-sections having diameters preferably not more than $10\mu$ greater than the respective diameters of the light conductors to be coupled.

Via the transverse duct 5, a liquid 7, for example, hexachlorbutadiene (refractive index of about 1.55) or an other substance having an approximately the same refractive index, can be forced into the duct 3. To this end, a suction/pressure device 9, for example, in the form of a syringe, is connected to a boss on the side of the body, through which the transverse duct 5 passes, via an elastic ring 10 or another suitable connection means. The ends 11 of the light conductors 13 are slid into the duct 3 on both sides, such that they contact the liquid 7. The ends 11 of the light conductors are subsequently sucked into the duct 3 by sucking a portion of the liquid out of the duct 3 by means of the device 9. In the case of a comparatively large difference in the diameters of the duct 3 and the light conductors 13, air bubbles may appear between the ends 11 of the light conductors 13 during the removal of the liquid 7. In order to prevent the occurrence of such air bubbles, an adequate quantity of liquid 7 is applied on both sides of the continuous duct 3, for example, by placing the connecting plug completely in a container filled with liquid 7. The suction/pressure device 9 and the elastic ring 10 can be removed, and the transverse duct 5 can be sealed by a cap 12 or another suitable means.

By giving the body a multiple construction, i.e. constructing a body comprising a plurality of ducts, each of which can be separately connected, in groups or together, to a suction/pressure device, a plurality of light conductor couplings can be simultaneously realized. By choosing the refractive index of the liquid to be equal or substantially equal to the refractive index of the core of the light conductors, little light will be lost due to reflections at the transitions when the light conductors are coupled. By choosing the refractive index of the duct wall to be approximately equal to the refractive index of the jacket of the light conductor, an even better coupling can be obtained, notably for multimode light conductors.

A liquid of an adhesive nature will suck the light conductors against the wall of the duct because of its adhesive behaviour. A liquid of a pronounced cohesive nature, however, will ensure very good positioning of the light conductor in the center of the duct. For making a more permanent connection, use can be made of a hardenable adhesive, for example, Canada balsam, which is permitted to solidify after the light conductors have been coupled. Impurities can be removed from the duct in the plug according to the invention which also contributes to a higher reliability of the coupling to be made, by forcing an adequate quantity of liquid through the duct.

It is a major additional advantage of the described connecting plug that only simple tools are required for coupling the light conductors, so that reliable coupling of light conductors can be realized also outside laboratoria. It will be obvious that, using the described connecting plug, light conductors of different diameter with respect to each other can also be coupled, the diameter of the duct then being adapted, for example, by drilling or milling, in the portion where the light conductor having the largest diameter is to be fitted. The transverse duct then opens into the duct, for example, at the area of the transition from the one to the other diameter. The connecting plug is also suitable, notably the embodiment in which the duct has a different diameter on both sides, for coupling light conductors to detectors, light sources, intensifiers and the like.

What is claimed is:

1. A method of coupling light conductors using a connecting plug, having a body having a continuous longitudinal duct therethrough for receiving the conductors to be coupled, a transverse duct having a first end opening into a side wall of the longitudinal duct and a second end, and means for connecting said second end to a suction/pressure device, comprising the sequential steps of injecting a transparent liquid through the transverse duct into the longitudinal duct, inserting ends of the conductors into the longitudinal duct from opposite directions at least until they contact the injected liquid, sucking a porion of said liquid back through the longitudinal duct so as to suck said ends toward each other, such that at least a space between said ends remains filled with liquid, and sealing said transverse duct.

2. A method as claimed in claim 1, wherein said liquid is a hardenable material, comprising in addition the step of permitting said liquid to solidify after said sucking step.

* * * * *